US012800466B2

(12) United States Patent
Han et al.

(10) Patent No.: US 12,800,466 B2
(45) Date of Patent: Nov. 17, 2026

(54) COLLOIDAL PARTICLE INJECTION

(71) Applicant: TSI Incorporated, Shoreview, MN (US)

(72) Inventors: Hee-Siew Han, Minneapolis, MN (US); Nathan T. Birkeland, Mounds View, MN (US); Kenneth R Farmer, II, Lake Elmo, MN (US)

(73) Assignee: TSI Incorporated, Shoreview, MN (US)

( * ) Notice: Subject to any disclaimer, the term of this patent is extended or adjusted under 35 U.S.C. 154(b) by 0 days.

(21) Appl. No.: 18/762,864

(22) Filed: Jul. 3, 2024

(65) Prior Publication Data

US 2025/0012702 A1 Jan. 9, 2025

Related U.S. Application Data

(60) Provisional application No. 63/524,729, filed on Jul. 3, 2023.

(51) Int. Cl.
*G01N 15/10* (2024.01)

(52) U.S. Cl.
CPC . *G01N 15/1012* (2013.01); *G01N 2015/1014* (2024.01)

(58) Field of Classification Search
CPC ....... G01N 15/1012; G01N 2015/1014; G01N 1/38; G01N 15/1459; G01N 15/06; G01N 2015/0053; G01N 15/1404; G01N 2001/385
USPC .......... 73/1.01–1.3, 1.82, 1.86, 23.33, 53.07, 73/61.42, 64.56, 863, 863.01, 8, 63.72, 73/864.83, 865.5, 866; 366/140, 142, 366/192; 222/154; 324/71.4; 377/29
See application file for complete search history.

(56) References Cited

U.S. PATENT DOCUMENTS 5,676,494 A 10/1997 Ruch
5,686,650 A * 11/1997 Suslavich .......... G01N 15/1012 73/1.01

FOREIGN PATENT DOCUMENTS

CN 113720738 A * 11/2021 ............. G01N 15/06
CN 215339409 12/2021
CN 114486440 A * 5/2022 ............. G01N 15/06
(Continued)

OTHER PUBLICATIONS

"International Application Serial No. PCT US2024 036641, International Search Report mailed Oct. 30, 2024", 3 pgs.
(Continued)

*Primary Examiner* — Robert R Raevis
(74) *Attorney, Agent, or Firm* — Schwegman Lundberg & Woessner, P.A.

(57) ABSTRACT

The disclosed subject-matter discloses systems and methods to calibrate or compare particle monitors. In one example, the disclosed subject-matter includes a sample-fluid source to provide test particles to at least one particle instrument under test. A mixing component is coupled upstream of the at least one particle instrument under test. Aa junction component, having a first-inlet port to be coupled to a first-fluid supply, and a second-inlet port to receive test particles from the sample-fluid source. The junction component mixes a fluid received from the first-fluid supply and the test particles received from the sample-fluid source prior to transporting through the outlet to the mixed fluid to mixing coil. Other apparatuses and methods are disclosed.

20 Claims, 10 Drawing Sheets

(56) References Cited

FOREIGN PATENT DOCUMENTS

| | | | | | |
|---|---|---|---|---|---|
| CN | 115561132 | A | * | 1/2023 | ......... G01N 15/0826 |
| JP | 2019064866 | | | 4/2019 | |
| WO | 9612194 | | | 4/1996 | |
| WO | 2013122646 | | | 8/2013 | |
| WO | WO-2021113652 | A1 | * | 6/2021 | ............. G01N 33/49 |

OTHER PUBLICATIONS

"International Application Serial No. PCT US2024 036641, Written Opinion mailed Oct. 30, 2024", 3 pgs.

"International Application Serial No. PCT/US2024/036641, International Preliminary Report on Patentability mailed Jan. 15, 2026", 6 pgs.

* cited by examiner

COLLOIDAL PARTICLE INJECTION

CLAIM OF PRIORITY

This application claims the priority benefit to U.S. Provisional Patent Application Ser. No. 63/524,729, filed on 3 Jul. 2023, and entitled "COLLOIDAL PARTICLE INJECTION," which is incorporated herein by reference in its entirety.

TECHNICAL FIELD

The subject matter disclosed herein relates generally, but not by way of limitation, to testing particle instruments using colloidal particles or other particles.

BACKGROUND

In order to maintain measurement accuracy and performance specifications, liquid-borne particle instruments and counters frequently need to be verified and calibrated with standard size particles. One type of standard-sized particles are referred to as colloidal particles. Colloidal particles are small particles with a dimension scale ranging from nanometers to micrometers and are suspended as a colloidal solution in liquid. Commercially available and commonly used colloidal particles are polystyrene latex beads, metal particles (such as gold), and silica particles. These size-specific colloidal solutions are often highly concentrated so some sample preparation procedures are normally required before they can be used for instrument testing and calibration.

Currently, there is no standardized method to inject colloidal particle samples into a liquid stream. Systems for injecting colloidal particle samples into a liquid stream are expensive and difficult to use.

The information described in this section is provided to offer a person of ordinary skill in the art a context for the following disclosed subject-matter and should not be considered as admitted-prior art.

SUMMARY

Various embodiments of the disclosed subject-matter include, for example, a colloidal-particle injection system. In various embodiments, the injection system can include an injection pump, an injection valve, a junction component (e.g., a mixing tee), and a mixing component (e.g., a mixing coil).

In one exemplary embodiment, the disclosed subject-matter describes a system to test particle instruments using colloidal particles or other particles. The system of this embodiment includes a sample-fluid source to provide test particles to at least one particle instrument under test. The sample-fluid source is selected from at least one source comprising a sample fluid-delivery device and a sample-fluid reservoir. A mixing component is coupled upstream of the at least one particle instrument under test. The embodiment also includes a junction component having a first-inlet port, a second-inlet port, and an outlet. The first-inlet port is to be coupled to a first-fluid supply, the second-inlet port is to receive test particles from the sample-fluid source. The junction component is further to mix a fluid received from the first-fluid supply and the test particles received from the sample-fluid source prior to transporting the mixed fluid through the outlet to the mixing component.

In one exemplary embodiment, the disclosed subject-matter is a method for testing particle instruments using colloidal particles or other particles. The method of this embodiment includes receiving a sample fluid by at least one particle instrument under test from an outlet of a junction component; loading a sample loop with the sample fluid by controlling an injection valve; directing a first fluid from a first supply to a primary inlet of the junction component; directing the sample fluid from the sample loop to a secondary inlet on the junction component; and directing a mixture of the first fluid and the sample fluid to the at least one particle instrument under test.

In one exemplary embodiment, the disclosed subject-matter is a computer-readable medium containing instructions that, when executed by a machine, cause the machine to perform operations for testing particle instruments using colloidal particles or other particles. The operations of this embodiment include receiving a sample fluid by at least one particle instrument under test from an outlet of a junction component; loading a sample loop with the sample fluid by controlling an injection valve; directing a first fluid from a first supply to a primary inlet of the junction component; directing the sample fluid from the sample loop to a secondary inlet on the junction component; and directing a mixture of the first fluid and the sample fluid to the at least one particle instrument under test.

BRIEF DESCRIPTION OF THE DRAWINGS

Various ones of the appended drawings merely illustrate examples of various implementations of the disclosed subject-matter and should not be considered as limiting its scope.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
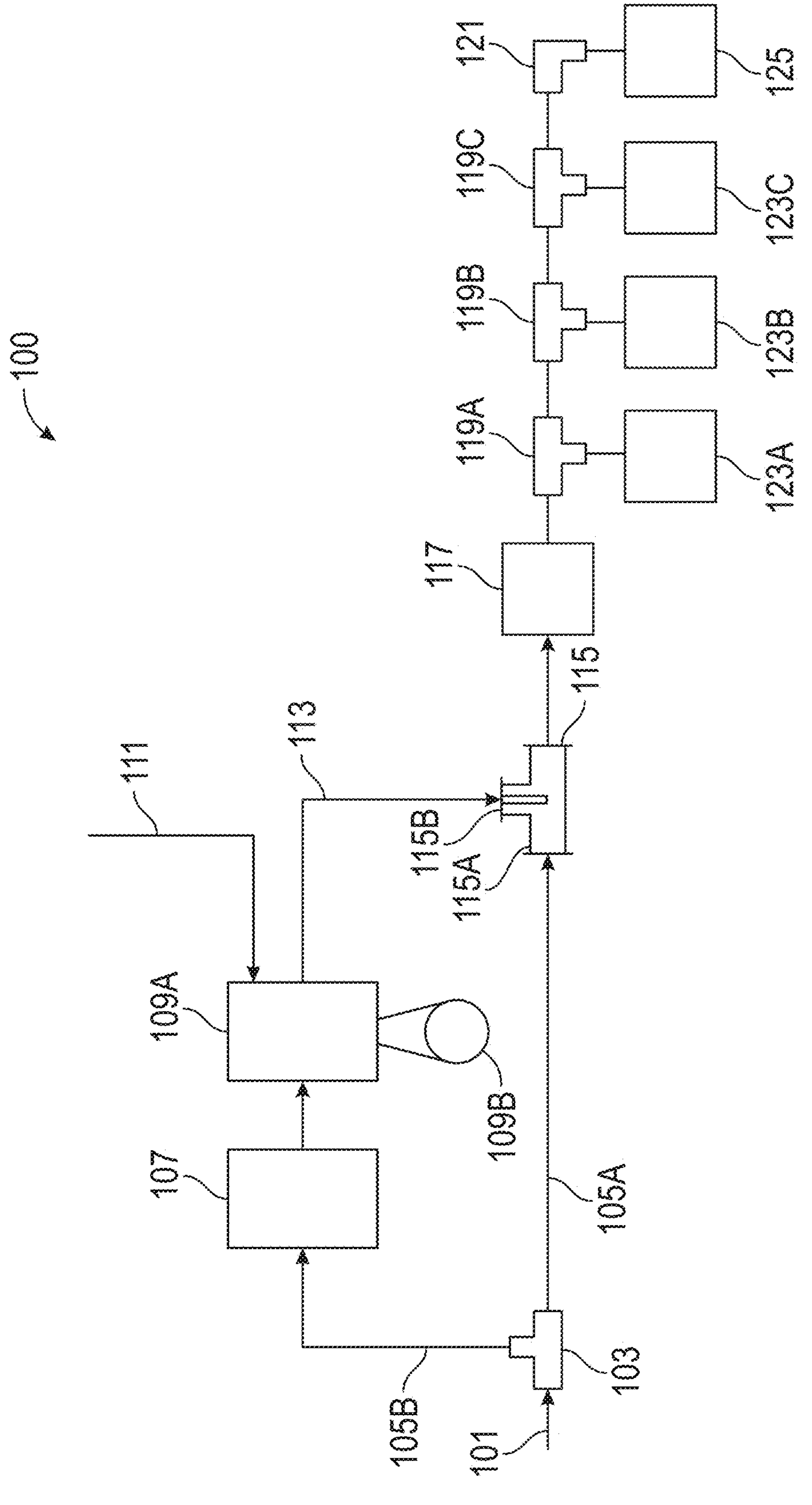
FIG. 1 shows an exemplary embodiment of a system to test equipment using, for example, colloidal particles.

The following description includes a discussion of figures having illustrations given by way of examples of implementations of the disclosed subject-matter. The drawings should be understood by way of example, and not by way of limitation. As used herein, references to one or more "embodiments" are understood to be describing a particular feature, structure, or characteristic included in at least one implementation of the disclosed subject-matter. Thus, phrases such as "in one embodiment," "in an exemplary embodiment," or "in an alternative embodiment" appearing herein describe various embodiments and implementations of the disclosed subject-matter, and do not necessarily all refer to the same embodiment. However, the embodiments are also not necessarily mutually exclusive from one another. To identify easily the discussion of any particular element or act, the most significant digit or digits in a reference number (e.g., element number) refer to the figure ("FIG.") number in which that element or act is first introduced.

In various embodiments described herein, the disclosed subject-matter describes a particle injection system for injecting test particles, including colloidal particles. An example of the disclosed subject-matter can help maintain measurement accuracy and performance specifications for liquid-borne particle instruments, counters, and monitors. Also, the disclosed subject-matter further provides a means to frequently and easily maintain the accuracy and specifications of such instruments and counters.

Various embodiments of the disclosed subject-matter can be configured to provide a test sample for evaluating performance of an instrument. The test sample can include a mixture of ultra-pure water (UPW), or other liquid, and test particles (such as colloidal particles).

In one example, a method includes extracting a small amount of a solution sample from the colloidal-solution bottle, diluting the sample to a desired concentration range, and then injecting the diluted sample into a liquid stream coupled to one or more devices or instruments under test.

Since liquid-borne particle instruments have rather low concentration limits, in order to reduce or minimize measurement uncertainties due to the instrument detection coincidence error, liquid particle samples typically need to be diluted to suitable concentration ranges before the injection. In one example, a diluted sample is transferred to the sample loop which temporarily stores the liquid sample. One embodiment described herein includes loading the diluted sample into a syringe and then injecting the sample into the sample loop via an injection valve. The injection valve allows the sample to be injected into the system without disturbing the ultrapure water (UPW) flow in the sample injection route.

Each of the non-limiting examples and embodiments disclosed herein can stand on its own, or can be combined in various permutations or combinations with one or more of the other examples. This overview is therefore intended to provide an overview of subject matter of the disclosed subject-matter. It is not intended to provide an exclusive or exhaustive explanation of the subject matter. The detailed description is therefore included to provide further information about the disclosed subject-matter.

With reference to FIG. 1, an exemplary embodiment of a system 100 to test equipment using, for example, colloidal particles, is shown. FIG. 1 is shown to include a tee connection 103, an injection pump 107, an injection valve 109A, a line to provide an inlet for a sample fluid 111 (e.g., from a sample-fluid source, such as a sample fluid-delivery device or a sample-fluid reservoir, both of which are described in more detail herein), a junction component 115, and a mixing component 117, such as a mixing coil or other device to mix various fluidic coms, including the particle-laden samples, together). The mixing component 117 is arranged to be coupled fluidically to a number of external-tee connections 119A . . . 119C.

The external-tee connections 119A . . . 119C, are, in turn, arranged to be coupled to a number of test units 123A . . . 123C, respectively. Although three of the external-tee connections 119A . . . 119C and the number of test units 123A . . . 123C are shown, there is no requirement that as many as three or as few as three are used with the system 100. The system 100 may be used to test a single test unit or any number of test units (provided there is sufficient fluid flow through the system 100 to match or exceed a sampling flow used by each of the various test units). For example, if each of the test units 123A . . . 123C is based on a flow rate of 28.3 liters/minute (approximately 1 $ft^3$/minute), then the system 100 will provide a flow rate of at least 84.9 liters/minute (approximately 3 $ft^3$/minute). If the system 100 provides a higher flow rate, then excess flow can be routed through an excess-flow elbow 121 into a drain 125. The drain 125 may be, for example, a reservoir or container sized to accommodate a pre-determined excess flow rate for a given testing time. In other examples, the drain 125 may be a facility drain.

In various embodiments, the drain 125 can be manipulated to control or limit flow. In various embodiments, the last device in a series of devices under test, such as the test unit 123C, can be set to provide a desired delay (for example, within a minute). For example, in some situations the end-user of the system 100 may keep UPW flowing into the drain 125 24-hours per day so as to keep the transport lines wet and clean. Increasing a delay time can help to reduce costs of UPW usage when the system 100 is not in use. In some situations, a flow of fluid to the drain 125 can be reduced to match or reproduce certain desired test configurations. In some embodiments, an objective may be to reduce or minimize the delay in response time (due to the fluid-transport time). However, in other situations, an excess delay may be undesirable. Additionally, the drain 125 can include a valve, such as a needle valve or a throttling valve, to control fluid flow. The drain 125 can include a mass flow controller, a flow meter, a rotameter, or other device to control or regulate the fluid flow.

Each of the test units 123A . . . 123C may comprise one or more of a combination of liquid-borne particle-counting instruments and/or liquid-borne particle-concentration instruments. One or both of these instrument types may be configured to scan through a particle counting or a particle concentration range of sizes. Some liquid-borne particle instruments and counters are configured to operate with a low concentration limit. In order to reduce measurement uncertainties due to the instrument-detection coincidence-error (coincidence losses), liquid particle samples, for example, may be diluted to a suitable concentration before the liquid is injected or introduced into the device under test. Such concentration levels may be found by consulting specification supplied by the manufacturer of the particle instrument.

With continuing reference to FIG. 1, the injection pump 107 can be used to pump a second fluid 105B received from a second fluid-port (e.g., an upper leg) of the tee connection 103, which is coupled downstream from an inlet-fluid supply 101. The inlet-fluid supply 101 may comprise ultrapure water (UPW). The injection pump 107 may be used to pump the second fluid 105B into the injection valve 109A at a pre-determined pressure and/or flow rate. For example, fluid flowing through the tee connection 103 and the junction component 115 are roughly at the same liquid pressure. The injection valve 109A and the sample loop 109B can have a significant pressure drop. Therefore, the injection pump 107 assists fluid flow through the injection valve 109A and the sample loop 109B. The injection pump 107 therefore pulls fluid liquid from the tee connection 103 and pushes the fluid through injection valve 109A and the sample loop 109B, and then on to the junction component 115. A flow rate of the second fluid 105B can therefore be adjusted preciously and accurately and controlled by the injection pump 107. Various embodiments of the junction component 115 are described below, with reference to FIGS. 2A through 2D.

In various embodiments, the injection pump 107 can be modulated, For example, the injection pump 107 can be powered on and powered off. In this example, fluid flow can continue through the junction component 115 and fluid flow in the injection pump 107 can be stopped. In this manner, the flow through the junction component 115 continues to purge the line and maintain clean flow. If the injection pump 107 is powered, then some fluid will pass through the injection valve as shown with regard to FIGS. 3A and 3B, as discussed below. As noted, the injection valves of FIGS. 3A and 3B can be modulated to move fluid into the sample loop 109B.

In addition to receiving the second fluid 105B from the injection pump 107, the injection valve 109A also receives a sample fluid 111 from a sample-inlet supply line. The sample fluid 111 may be diluted as desired. As described in more detail below with reference to FIG. 3A and FIG. 3B, both the second fluid 105B and the sample fluid 111 may be directed into a sample loop 109B.

According to one example of the system 100 in use, a diluted version of the sample fluid 111 can be loaded into, for example, a syringe and, thereafter, the sample fluid 111 can be directed through the injection valve 109A and into the sample loop 109B. The injection valve 109A allows the sample fluid 111 to selectively be injected into one or more devices under test, such as the test units 123A . . . 123C, without disturbing a flow of a first fluid 105A, received from the inlet-fluid supply 101, through a first-outlet port (e.g., a lower leg) of the tee connection 103. The sample fluid 111 may then be transferred into a second-inlet port 115B (the top leg) on the junction component 115 without disturbing a flow of the first fluid 105A carried to the junction component 115 via a first-inlet port 115A (the left-side leg). As described in more detail below with reference to FIGS. 3A and 3B, the second fluid 105B, flowing from an outlet of the injection pump 107, can bypass the sample loop 109B when the injection valve 109A is operated in a "load" mode.

A continuous flow of the second fluid 105B, while flowing in the injection route through the injection pump 107 and the injection valve 109A to a transport line carrying an outlet fluid 113 from the injection valve 109A, can be used to reduce or eliminate contaminants in the transport line between the injection valve 109A and the junction component 115.

After the sample fluid 111 has been transferred into to the sample loop 109B, colloidal particles stored in the sample loop 109B can then be routed to the second-inlet port 115B (the top leg) of the junction component 115 while the injection valve 109A is operated in an "inject" mode.

In the inject mode, the second fluid 105B traveling through the injection pump 107 is routed through the sample loop 109B, which pushes the colloidal particles into the second-inlet port 115B of the junction component 115.

To ensure the sample colloidal-particles is well-mixed with the first fluid 105A, the junction component 115 can introduce the particle-laden sample fluid from the outlet fluid 113 into an axial flow of the first fluid 105A at a position near a longitudinal axis of the junction component 115. In one example, the second-inlet port 115B is coupled to a discharge nozzle or tubing that protrudes partially (e.g., in certain embodiments, about half-way) into a main bore of the junction component 115 such that the outlet fluid 113 carrying the liquid injected with colloidal particles enters the fluid flow substantially orthogonally with respect to the incoming first fluid 105A. Examples of the mixing processes and examples of configurations of the various ports are described in more detail with reference to FIGS. 2A through 2D, below.

A combined flow of the outlet fluid 113, carrying the liquid injected with colloidal particles, and the first fluid 105A is then routed to an input port of the mixing component 117. The mixing component 117 is configured to induce an incoming fluid flow into a circular path, as described in more detail below with reference to FIG. 4. The first fluid 105A and the sample fluid 111 received through the injection valve 109A through an outlet transfer line as outlet fluid 113 is therefore mixed in the mixing component 117. In addition, the mixing component 117 provides additional mixing time before the mixed flow arrives at the test units 123A . . . 123C.

In various embodiments, the mixing component 117 can include a helical reactor configured for static mixing or heat and mass transfer. The development of secondary flows (e.g., Dean vortices) in helical tubes can enhance radial mixing and suppress low axial back-mixing. This mixing can increase heat and mass transfer and reduce residence time. In a specific exemplary embodiment, the mixing component 117 can include looped-together elements configured to generate secondary flow to promote mixing As shown in FIG. 1, test units 123A . . . 123C receive the mixed fluid, which may contain colloidal particles depending on a mode of operation, from the mixing component 117. As noted above, any excess fluid is routed to the drain 125. As shown, test units 123A . . . 123C are arranged in serial order. However, in a specific exemplary embodiment, a single one of the test units 123A . . . 123C, such as the test unit 123A, can be evaluated individually. In other embodiments, a plurality of the test units 123A . . . 123C can be evaluated in a network including any combination of fluid lines, along with respective test units, placed in parallel with each other and fluid lines placed in serial, along with respective test units. Other components not shown explicitly, but understandable to a person of ordinary skill in the art upon reading and understanding the disclosed subject-matter, such as shut-off valves, divert valves, and/or other components, may also be included.

Figure 2A:
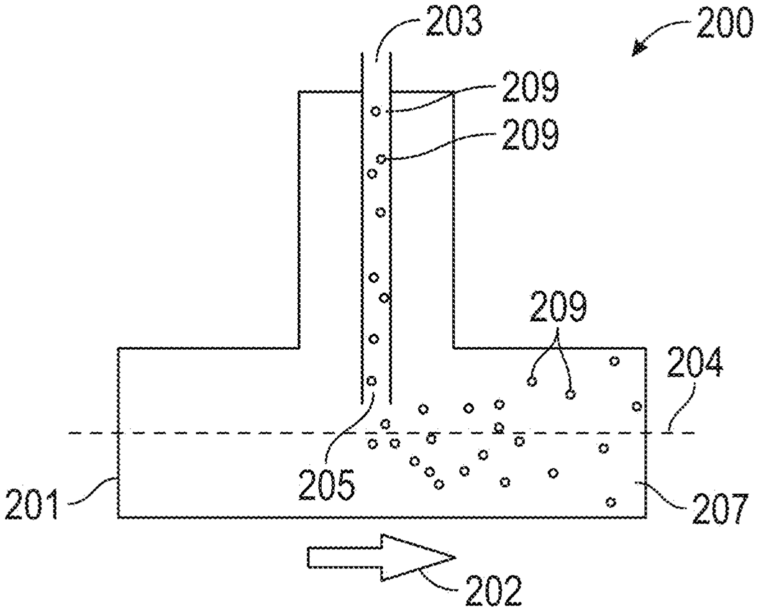
FIGS. 2A through 2D show various exemplary embodiments of a junction component, which may be used with the system of FIG. 1 or any of the other exemplary systems described herein.

Referring now to FIGS. 2A through 2D, various exemplary embodiments of junction components, which may be used with the system of FIG. 1 or any of the other exemplary systems described herein, are shown. For example, FIG. 2A shows one embodiment of a junction component 200. The junction component 200 may be the same as or similar to the junction component 115 of FIG. 1.

The junction component 200, which may be considered to be a fluid-mixing tee, is shown to include a primary inlet 201 (e.g., a first-inlet port), a secondary inlet 203 (e.g., a second-inlet port), and an outlet 207. The primary inlet 201 and the outlet 207 of the junction component 200 are substantially aligned on a longitudinal axis 204. Fluid entering at the primary inlet 201 is carried in an axial-flow direction 202. The junction component 200 includes the secondary inlet 203 disposed at a radial location, relative to the longitudinal axis 204. As is also shown in FIG. 2A, at an opposing end from the secondary inlet 203, a discharge outlet 205 is disposed near the longitudinal axis 204. The discharge outlet 205 projects into the region of fluid flowing in the axial-flow direction 202. In various examples, particles 209 carried to the junction component 200 by way of the secondary inlet 203 are dispersed in the axial flow of fluid substantially along the longitudinal axis 204. In various embodiments, the discharge outlet 205 can include an open end of a tube. In various embodiments, the discharge outlet 205 can include a discharge port or a number of discharge ports configured annularly about longitudinal axis 204.

Figure 2B:
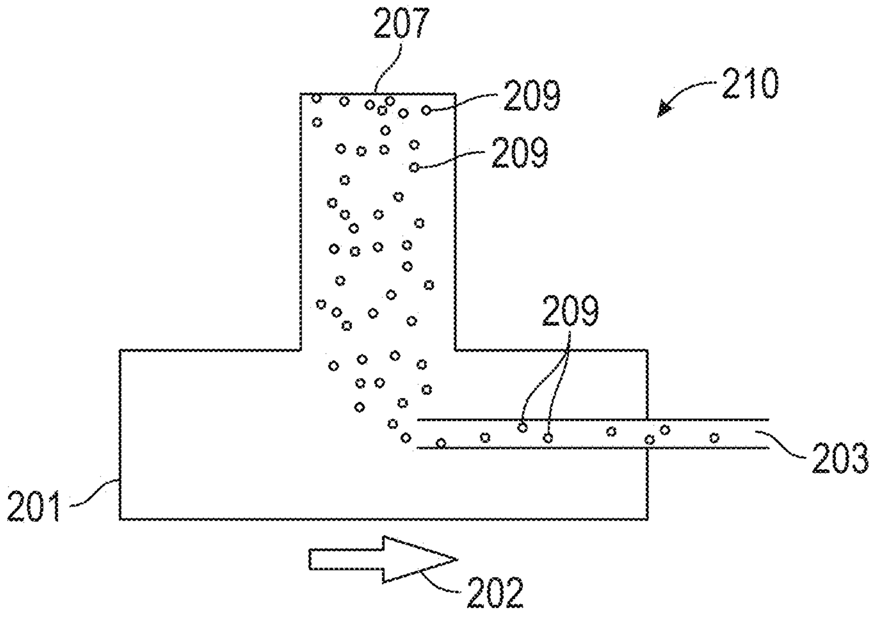

FIG. 2B shows another embodiment of a junction component 210. The junction component 210 may be the same as or similar to the junction component 115 of FIG. 1. The junction component 210, which may be considered to be a fluid-mixing tee, is shown to include a primary inlet 201, a secondary inlet 203, and an outlet 207.

In contrast with the junction component 200 of FIG. 2A, the primary inlet 201 and the secondary inlet 203 of the junction component 210 are substantially aligned on a longitudinal axis of the junction component 210. Therefore, the junction component 210 would be rotated approximately 90° with reference to the junction component 200 of FIG. 2A when coupled within, for example, the system 100 of FIG. 1. Fluid entering at the primary inlet 201 is carried in an axial-flow direction 202. However, fluid entering from the secondary inlet is flowing in a direction opposite that of the axial-flow direction 202. Therefore, the secondary inlet 203 is arranged to carry fluid in a direction opposite to the fluid entering the junction component 210 from the primary inlet 201. Consequently, the opposing arrangements of the two inlets provides a fluid-mixing effect before the mixed fluid exits the junction component 210 through the outlet 207. The junction component 210 includes the outlet 207 disposed at a radial location, relative to the longitudinal axis of the junction component 210.

Figure 2C:
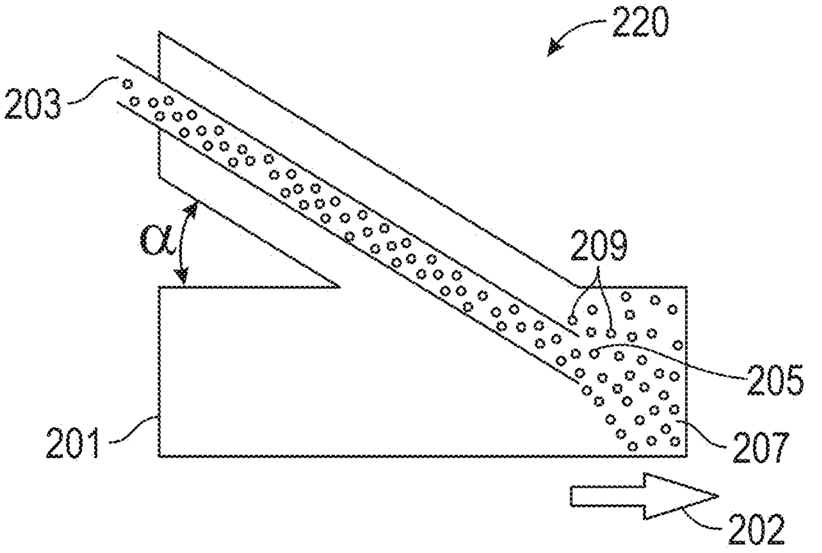

FIG. 2C shows another embodiment of a junction component 220. The junction component 220 may be the same as or similar to the junction component 115 of FIG. 1. The junction component 220, which may be considered to be a fluid-mixing tee, is shown to include a primary inlet 201, a secondary inlet 203, and an outlet 207.

In contrast with the junction component 200 of FIG. 2A, the primary inlet 201 and the secondary inlet 203 of the junction component 220 are arranged at an angle, a, with reference to one another. For example, the angle α may be any desired angle from greater than 0° to less than 180°. In a specific exemplary embodiment, the angle α may be any desired angle from about 10° to about 80°. In another specific exemplary embodiment, the angle α may be any desired angle from about 30° to about 60°.

Figure 2D:
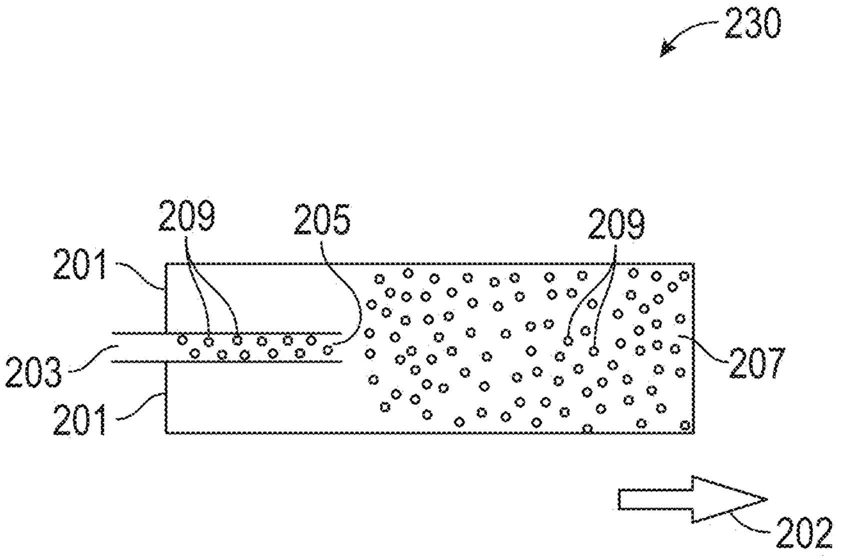

FIG. 2D shows another embodiment of a junction component 230. The junction component 230 may be the same as or similar to the junction component 115 of FIG. 1. The junction component 230, which may be considered to be a fluid-mixing tee, is shown to include a primary inlet 201, a secondary inlet 203, and an outlet 207.

In contrast with the junction component 200 of FIG. 2A, the primary inlet 201 and the secondary inlet 203 of the junction component 220 are arranged to be substantially concentric with one another. Further, although the secondary inlet 203 is shown as being arranged near a midpoint of the primary inlet 201, the secondary inlet 203 may be arranged to be above or below the primary inlet 201. In the latter configuration, the primary inlet 201 and the secondary inlet 203 may comprise two separate inlet tubes arranged substantially parallel to each other.

Figure 3A:
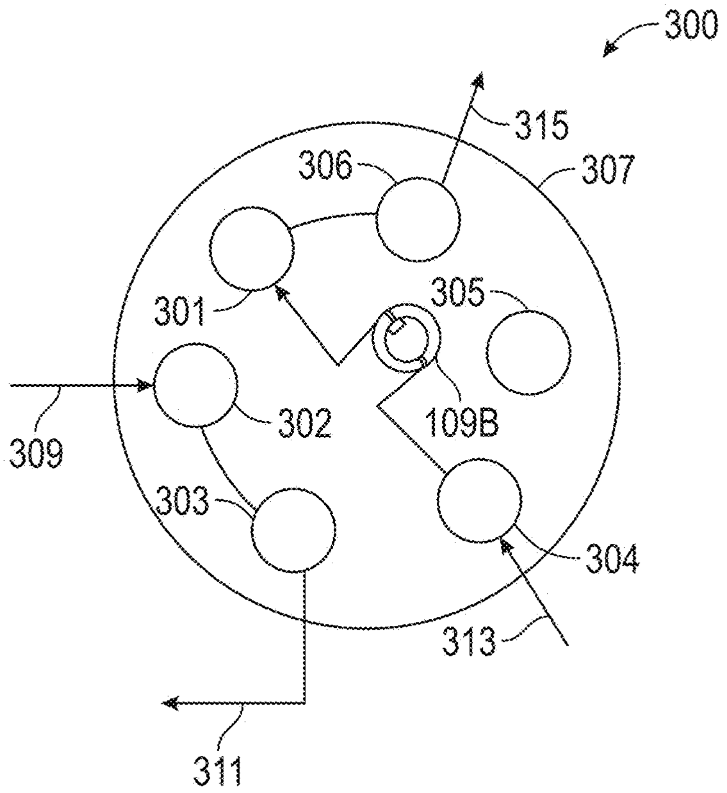
FIGS. 3A and 3B show various embodiments of an injection valve, which may be used with the system of FIG. 1 or any of the other exemplary systems described herein.
Figure 3B:
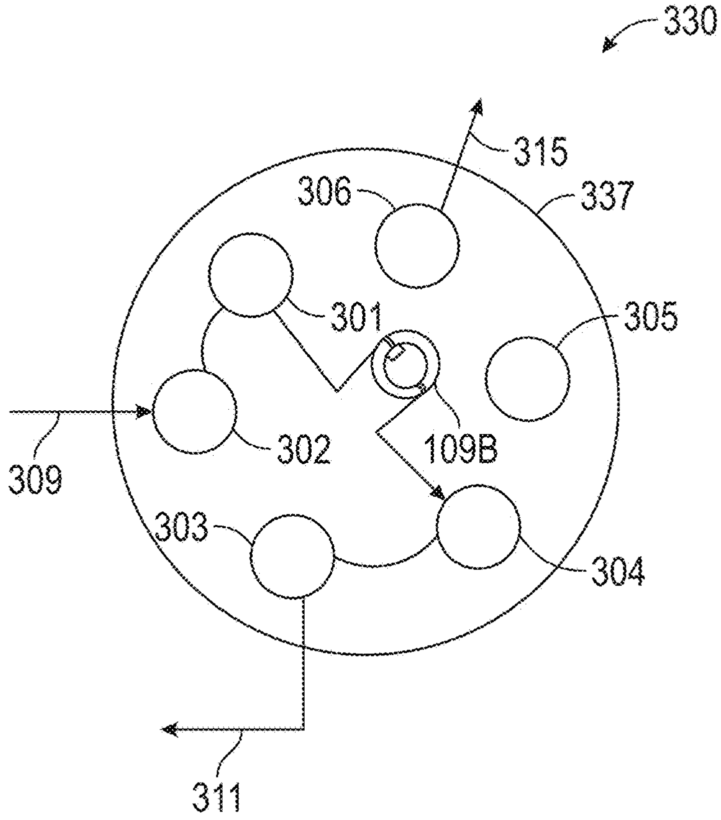

FIGS. 3A and 3B show various embodiments of an injection valve, which may be used with the system of FIG. 1 or any of the other exemplary systems described herein.

In one embodiment, an injection valve 300 of FIG. 3A and the injection valve 330 of FIG. 3B, may comprise a rotary cartridge, being shown in two positions. In a first position, as shown in FIG. 3A, the injection valve 300 is in a load mode 307. In a second position, as shown in FIG. 3B, the injection valve 330 is in an inject mode 337. In a specific exemplary embodiment, the injection valve 300 in the loading mode and the injection valve 330 are show, as a six port, ports 301 . . . 306, injection valve.

With concurrent reference to FIG. 1 and FIG. 3A, when the injection valve 300 is in the load mode 307, a liquid, such as ultra-pure water, from the injection pump 107 passes into port 302, through an inlet 309. The liquid then passes internally from port 302 to port 303, and then to junction component 115 through an outlet 311, as the outlet fluid 113. In this load mode, the sample loop 109B is bypassed and isolated from the injection pump 107 and from the junction component 115. Continuously purging the line carrying the outlet fluid 113 between the injection pump 107 and the junction component 115 with a particle-free liquid, for example, a particle-free UPW, ensures the line carrying the outlet fluid 113 remains substantially clean and wet when the system 100 is in use. Any excess liquid can be transferred to for example, a waste container, a sink, or other reservoir, or to a drain, such as the drain 125, through an excess-liquid outlet 315.

With concurrent reference now to FIG. 1 and FIG. 3B, when the injection valve 330 is in the inject mode 337, a colloidal-particle-laden version of the outlet fluid 113 can be transferred into the sample loop 109B via port 304 from a sample inlet 313 as received through the sample fluid 111 being coupled to the sample loop 109B. Directing the sample fluid 111 to port 304 will not affect the UPW flow from the injection pump 107. In a specific exemplary embodiment, a volume of injected liquid sample can be chosen to be at least twice the volume of the sample loop to reduce or minimize the cross-contamination between a later sample and an earlier sample. Liquid in excess of a capacity of the sample loop 109B exits from the port 306 and can be drained through the excess-liquid outlet 315 to, for example, a waste container, a sink, or other reservoir.

Consider an example in which the sample loop 109B holds 10 ml of fluid. In this case, a fluid volume of 15 ml or 20 ml can be introduced into the sample loop 109B and excess fluid is flushed out of the injection valve 330. The injection valve includes the excess-liquid outlet 315. If 15 ml is injected, then the first 5 ml of the 15 ml of injected liquid will be discharged via the excess-liquid outlet 315 and 10 ml is temporarily stored in the sample loop 109B. This 10 ml of the sample liquid will be routed into the junction component 115 when the injection valve is switched to the inject mode. That is, the previously loaded fluid is flushed out initially and the newly introduced fluid is injected. As noted above, in some examples the volume of the injected liquid sample is at least two times the volume of the sample loop 109B to reduce or minimize cross-contamination between new and old samples.

With continuing reference to FIG. 1 and FIG. 3B, after the transfer of the colloidal-particle-laden version of the outlet fluid 113 is completed, colloidal particles stored in the sample loop 109B can then be pushed into the junction component 115 by the UPW via the injection valve 330 operating in the inject mode 337. In the inject mode 337, ports 301 and 302, the sample loop 109B, and ports 303 and 304 are coupled. The UPW from the injection pump 107 slowly pushes colloidal particles out from the sample loop 109B and into the junction component 115. A time duration for colloidal particles to completely be pushed out from the sample loop 109B can be quantified. It is the time interval in which colloidal particles are presented in the transport line and available for the instruments under test to detect and measure them. The time at least partially depends on the liquid flow rate from the injection pump 107 and the volume of sample loop 109B (plus some nominal time to account for volumes of transport lines).

To reduce or minimize a sampling bias (e.g., from one test unit to another due to the sample no being sufficiently mixed so as to be substantially homogenous as far as particle concentration), the injected colloidal-particles can be uniformly distributed across the transport line cross-section before the measurement by a test unit. One goal in reducing or minimizing a sampling bias is to let all test units measure substantially the same particle concentration regardless a position of the test units in the "sampling train." Consequently, all test units can be placed randomly and still get the same measurement results. If colloidal particles are not well-mixed before reaching test units, different measurement results may otherwise occur when switching locations of test units. For example, one embodiment of the disclosed subject-matter utilizes a cross-flow design in which the injection tubing (e.g., the discharge outlet 205) of the junction component (e.g., the junction component 200) protrudes about half-way into the junction component so that the injected colloidal-particles mix substantially orthogonally with the incoming UPW. The cross-flow configuration creates significant flow turbulences that rapidly and effectively disperse colloidal particles into substantially an entirety of the whole flow cross-section.

Figure 4:
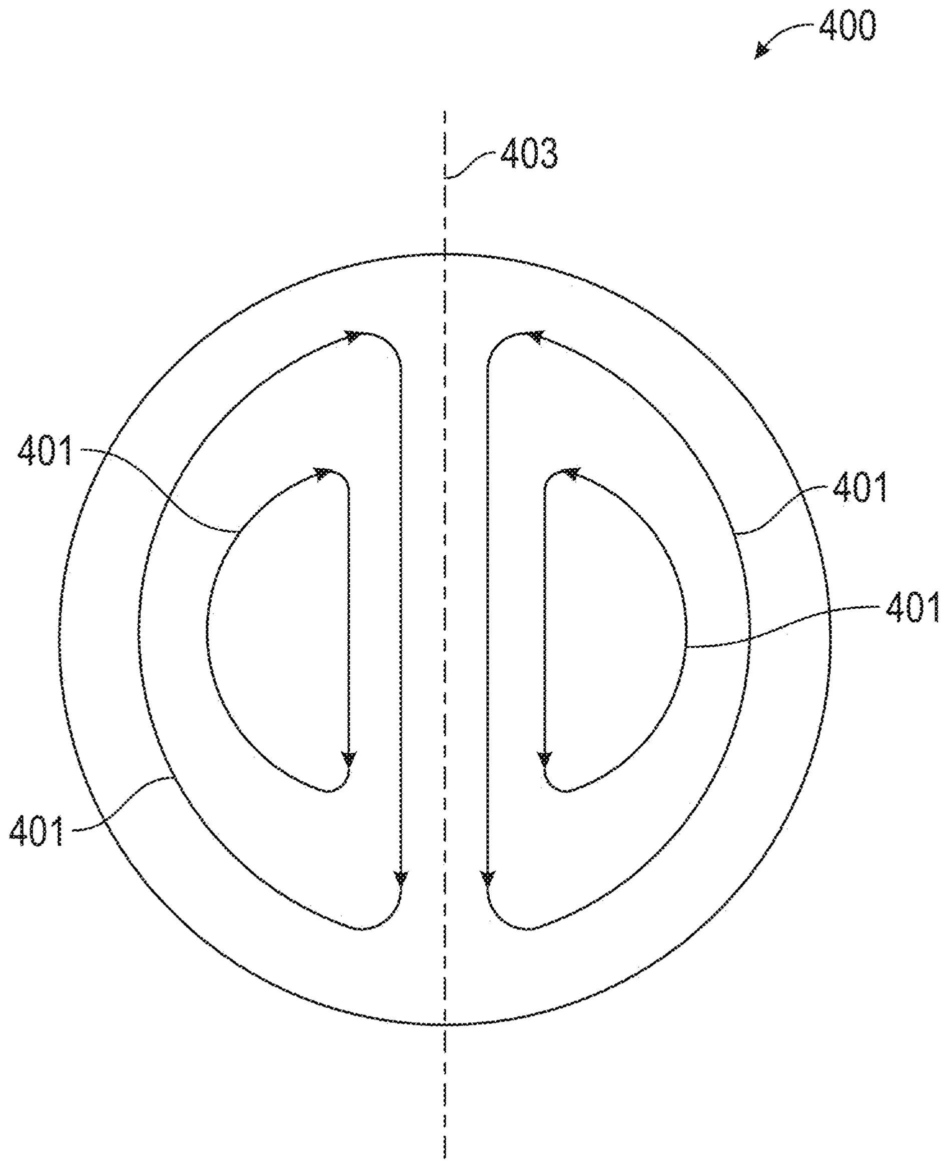
FIG. 4 shows cross-sectional view of an exemplary embodiment of a mixing component, which may be used with the system of FIG. 1 or any of the other exemplary systems described herein.

With reference now to FIG. 4, a cross-sectional view 400 of an exemplary embodiment of a mixing component (e.g., the mixing component 117 of FIG. 1), which may be used with the system of FIG. 1 or any of the other exemplary systems described herein, is shown. The combined flow (of UPW and dispersed particles) then passes through the mixing component 117 in which induced secondary flows caused by a circular movement of the flow 401 further enhances the UPW and colloidal particles mixing. The secondary flows occur because of a transverse pressure gradient causing the fluid near a center 403 of the tube to move toward the outside of the tube, while the fluid near the wall moves inwards. Therefore, FIG. 4 depicts secondary flows induced by the circular movement of the flow 401. Additionally, the mixing component 117 provides extra mixing residence time before the flow reaches the first test unit. A person of ordinary skill in the art, upon reading and understanding the disclosed subject-matter, will recognize how to determine to a desired residence time based on, for example, flow rates and volumes within the system.

In order to compare and calibrate instruments-under-test (e.g., the test units 123A . . . 123C of FIG. 1), a desired concentration level of injected particles can be calculated. There are two particle-concentration dilutions occurring in the injection process. A first dilution relates to the sample preparation as concentrations of commercially available size-specific colloidal-particle solutions are typically too high (e.g., to avoid coincidence losses as described above). Therefore, the solutions may benefit from being diluted first before the injection process occurs. A second dilution occurs when the injected sample mixes with the UPW at the junction component 115 (see FIG. 1). The dilution from the flow mixing can be determined by equation (1).

$$DilutionRatio_{Flow} = \frac{Q_{UPW} + Q_{Sample\ Injection}}{Q_{Sample\ Injection}} \quad (1)$$

For example, with reference to FIG. 1, where the first fluid 105A flowing into the first-inlet port 115A can be characterized as $Q_{UPW}$. The flow of the outlet fluid 113 and into the second-inlet port 115B (from the injection pump 107) can be characterized as $Q_{sample\ injection}$. Fluid flow into the drain 125 can be characterized as $Q_{bypass}$. Therefore, the overall dilution ratio is determined by equation (2).

$$DilutionRatio_{Total} = DilutionRatio_{samplePreparation} \times DilutionRatio_{Flow} \quad (2)$$

Figure 5:
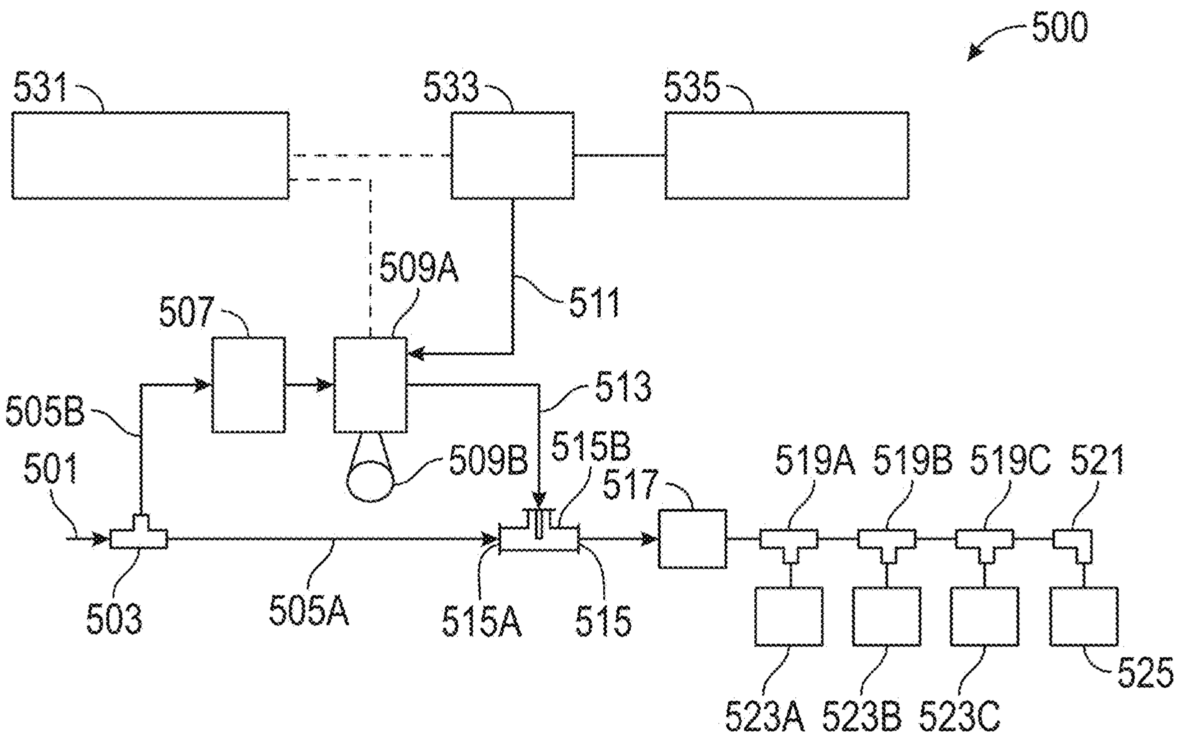
FIG. 5 shows an exemplary embodiment of another system to test equipment using, for example, colloidal particles.

FIG. 5 shows an exemplary embodiment of another system 500 to test equipment using, for example, colloidal particles. FIG. 5 is shown to include a tee connection 503, which is coupled downstream from an inlet-fluid supply 501 and splits the inlet-fluid supply 501 into a first fluid 505A and a second fluid 505B, an injection pump 507, an injection valve 509A having a first-inlet port 515A and a second-inlet port 515B, an inlet for a sample fluid 511, an outlet for transport of an outlet fluid 513 from the injection valve 509A, a junction component 515, and a mixing component 517. The mixing component 517 is arranged to be coupled fluidically to a number of external-tee connections 519A . . . 519C. The external-tee connections 519A . . . 519C, are, in turn, arranged to be coupled to a number of test units 523A . . . 523C, respectively. Although three of the external-tee connections 519A . . . 519C and the number of test units 523A . . . 523C are shown, there is no requirement that as many as three or as few as three are used with the system 500. The system 500 may be used to test a single test unit or any number of test units (provided there is sufficient fluid flow through the system 500 to match or exceed a sampling flow used by each of the various test units). If the system 500 provides a higher flow rate than the sampling flow rate used, then excess flow can be routed through an excess-flow elbow 521 into a drain 525. Each of the components of the system 500 described above may be the same as or similar to comparably numbered ones of the components of FIG. 1.

FIG. 5 is further shown to include a controller 531, a pump 533, and a reservoir 535. In an exemplary embodiment, the system 500 can be processor-controlled and may use one or more components as described below with reference to FIG. 9. The pump 533 and the injection valve 509A are communicatively coupled (e.g., hard-wired, wirelessly, or optically coupled electronically) to the controller 531 as indicated by broken lines. As further described with reference to FIG. 9 below, the controller 531 can include an analog or a digital processor, a memory, a user-interface, and a network interface.

The pump 533 can include an injection pump, a peristaltic pump, or other type of pump. The pump 533 draws sample fluid from the reservoir 535 and then slowly transfers the sample fluid to the sample loop 509B as described herein. The reservoir 535 can include, for example, a diluted suspension of colloidal particles in a fluid, contained within a vessel or other fluid supply container. The controller 531 can be configured to control an operation of the pump 533 and the injection valve 509A such that sample fluid can smoothly be transferred and temporarily be stored in the sample loop 509B and thereafter, conveyed to the junction component 515.

Figure 6:
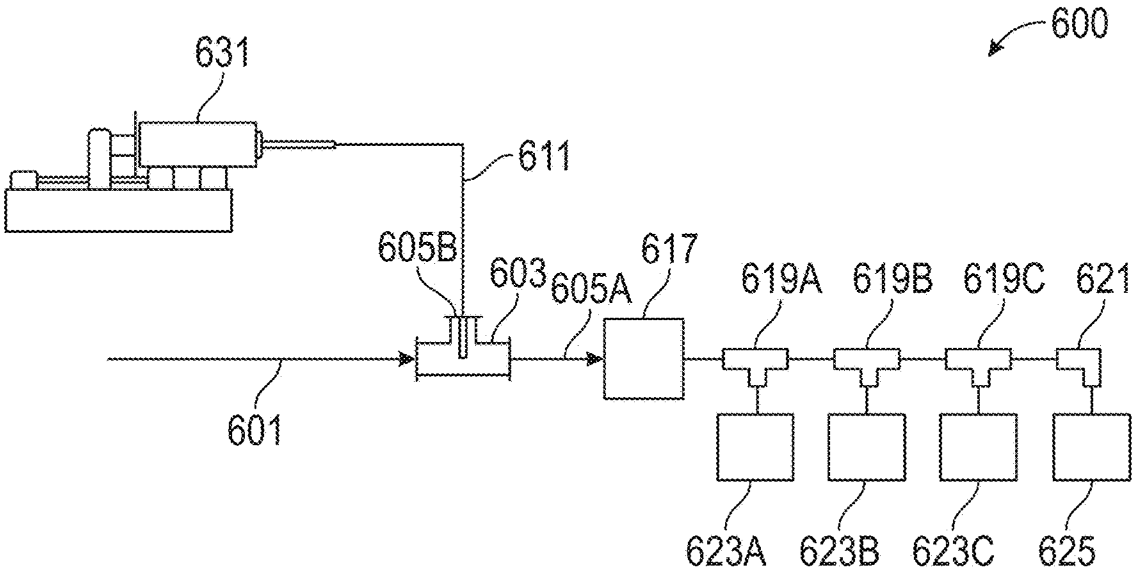
FIG. 6 shows an exemplary embodiment of another system to test equipment using, for example, colloidal particles.

FIG. 6 shows an exemplary embodiment of another system 600 to test equipment using, for example, colloidal particles. FIG. 6 is shown to include a syringe pump 631, a junction component 603, and a mixing component 617. The mixing component 617 is arranged to be coupled fluidically to a number of external-tee connections 619A . . . 619C. The external-tee connections 619A . . . 619C, are, in turn, arranged to be coupled to a number of test units 623A . . . 623C, respectively. Although three of the external-tee connections 619A . . . 619C and the number of test units 623A . . . 623C are shown, there is no requirement that as many as three or as few as three are used with the system 600. The system 600 may be used to test a single test unit or any number of test units (provided there is sufficient fluid flow through the system 600 to match or exceed a sampling flow used by each of the various test units). If the system 600 provides a higher flow rate than the sampling flow rate used, then excess flow can be routed through an excess-flow elbow 621 into a drain 625. Except for the syringe pump 631, each of the components of the system 600 described above may be the same as or similar to comparable ones of the components of FIG. 1.

The junction component 603 receives a sample fluid 611 into an inlet port 605B of the junction component 603. The junction component 603 also receives an inlet-fluid supply 601. An outlet fluid 605A, comprising the sample fluid 611 and the inlet-fluid supply as combined and mixed within the junction component 603 is transported to the mixing component 617.

The syringe pump 631 can be less costly and can be operated at a reduced cost compared with the systems 100, 500 of FIG. 1 and FIG. 5. In addition, an injection rate of a liquid sample can easily and accurately be adjusted with a built-in control provided by the syringe pump 631.

The system 600 of FIG. 6, albeit perhaps less costly to set up and operate than the systems 100, 500 of FIG. 1 and FIG. 5, may require additional operational time since the fluid flow is disturbed during reloading of the syringe pump 631. However, the additional time burden and complexities of syringe reloading may be tolerable in applications requiring a low number of sample injections.

Figure 7A:
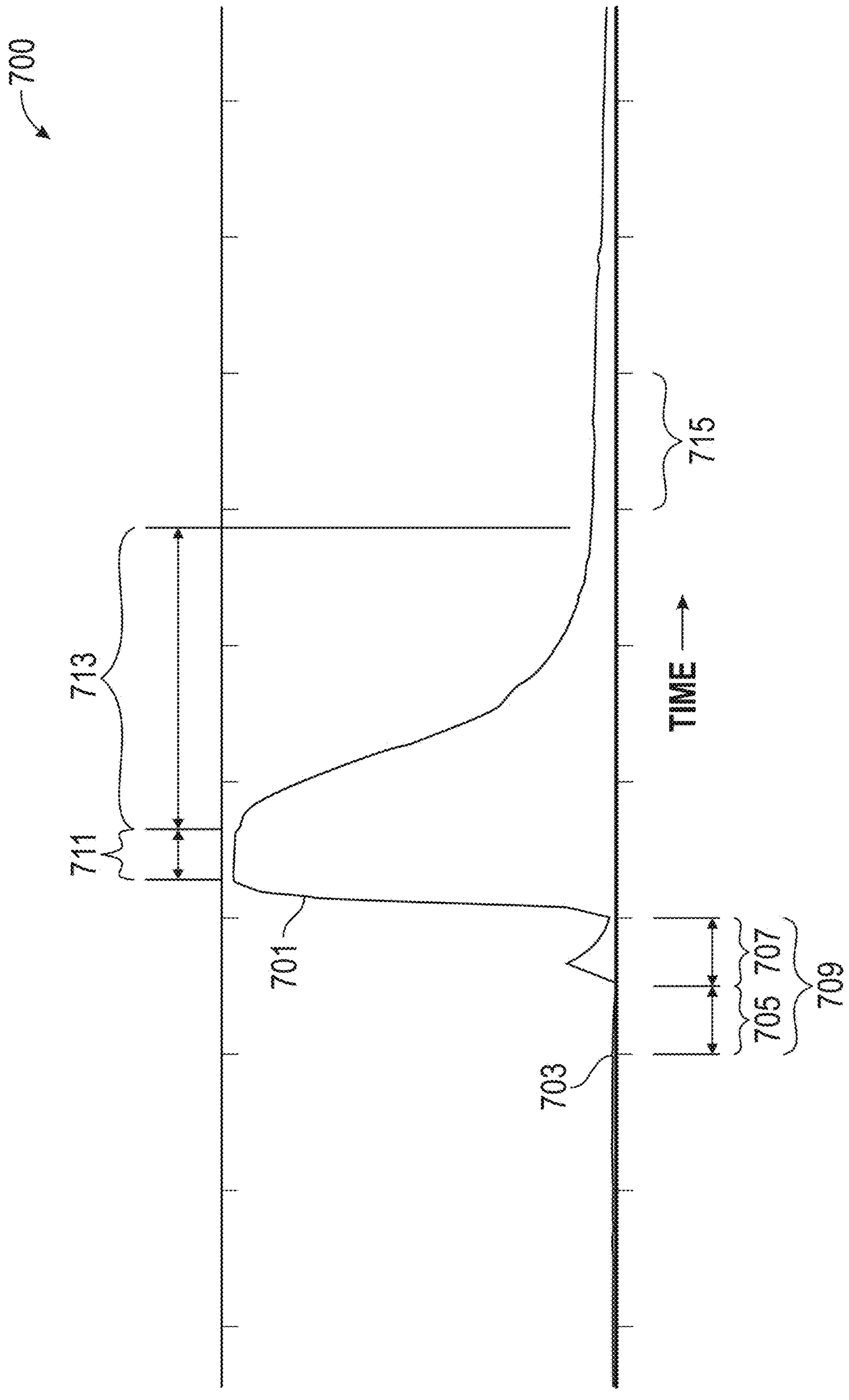
FIG. 7A shows an exemplary performance graph showing particle count as a function of time from one or more of the exemplary systems, such as the systems of FIG. 1, FIG. 5, and/or FIG. 6.

FIG. 7A shows an exemplary performance graph 700 showing particle count as a function of time from one or more of the exemplary systems, such as the systems 100, 500, 600 of FIG. 1, FIG. 5, and FIG. 6. The performance graph 700 shows an elapsed time response 701 from the particle injection system. A time period 715 of the performance graph 700 is approximately 15 seconds. Notice there is a delay time 705 in response before a transition region 707 occurs, having a total response time 709. The delay time 705 is a combination effect of transport times from the sample loop to the mixing tee, from the mixing tee to the inlet of the instrument under test, and an inherent detection response time of the instrument under test. Since the transport times typically comprise the dominant factors, the delay time 705 can be reduced by, for example, shortening the length of the transport tubing, and/or increasing the transport flows ($Q_{SampleInjection}$ and $Q_{UPW}$). In the transition region 707, the elevated signals are artifacts caused by the flow disruption and pressure fluctuation during valve switching, while the system is switched to injection mode 703.

After the transition region 707, there is a plateau region 711 in which the signals (particle counts) are relative stable and constant. This is the region where signals are useful. As colloidal particles from the sample loop begin to deplete, signals contain the mixture of colloidal particles and UPW, as shown as during a particle-depletion region 713, which indicates a particle-sample-plus-UPW region. Eventually, signals will return to the baseline values before the valve switching. Since the measurement data in the decaying period are typically not analyzed, in practice, one can switch the valve to the load mode, described above, before signals start to decay to cut off the tail at the particle-depletion region 713. By not analyzing measurement data in the particle-depletion region 713, a total test-time is reduced since a new sample can then be loaded into the sample loop during this period. The remaining previous sample in the sample loop is purged out by using the overfilling-technique discussed above.

Figure 7B:
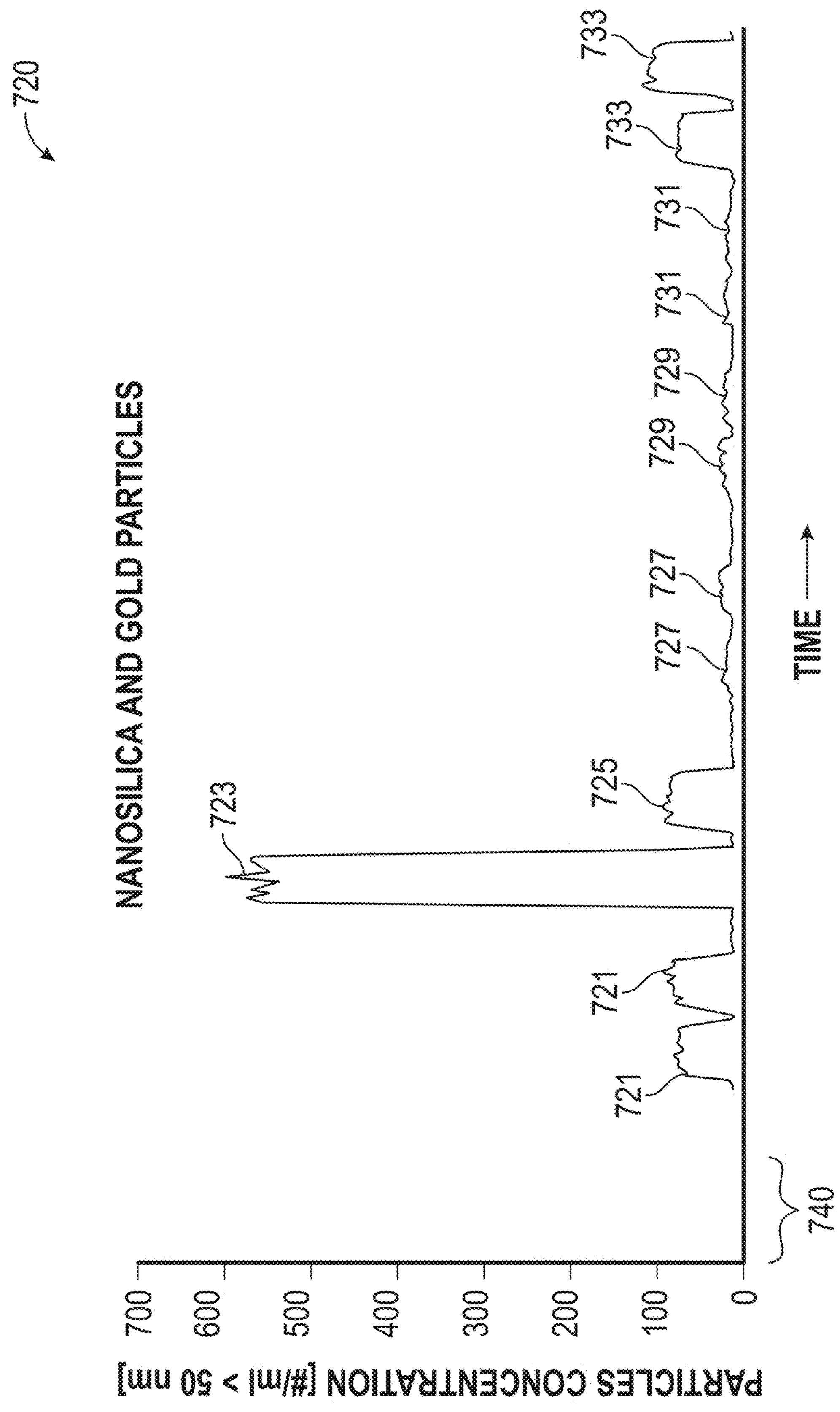
FIG. 7B shows an exemplary performance graph showing particle counts from nanosilica and gold particles, as a function of time, injected from one or more of the exemplary systems, such as the systems of FIG. 1, FIG. 5, and/or FIG. 6.

FIG. 7B shows an exemplary performance graph 720 showing particle counts from nanosilica and gold particles, as a function of time, injected from one or more of the exemplary systems, such as the systems 100, 500, 600 of FIG. 1, FIG. 5, and FIG. 6. A time period 740 of the performance graph 720 is approximately 30 seconds.

FIG. 7B shows instrument responses when various type of colloidal particles are injected into the liquid stream and measured by the instrument. As shown, the signal is higher when injected sample is less diluted (86 nm nanosilica, $10^7$ versus $10^8$ particles per ml dilution). FIG. 7B also shows baseline data (in which the graph is close to 0 particles per ml) which are indicative of the injection valve operating in a load mode. Thereafter, following loading, the sample can be taken and the valve can be operated in the inject mode.

The first two peaks 721 are based on 86 nm nanosilica particles having a dilution ratio of approximately $10^8$ particles per ml. The third peak 723 is based on 86 nm nanosilica particles having a dilution ratio of approximately $10^7$ particles per ml. The fourth peak 725 is based on 86 nm nanosilica particles having a dilution ratio of approximately $10^8$ particles per ml. The fifth and sixth peaks 727 are based on 60 nm nanosilica particles having a dilution ratio of approximately $10^8$ particles per ml. The seventh and eighth peaks 729 are based on 20 nm nanosilica particles having a dilution ratio of approximately $10^9$ particles per ml. The ninth and tenth peaks 731 are based on ultra-pure water, not having particles injected therein. The last two peaks 733 are based on 80 nm gold particles having a dilution ratio of approximately $10^6$ particles per ml. However, the gold particle injections indicate that a peak of the second injection is slightly higher than a peak of the first injection. This difference in peaks may correspond with transport particle losses as gold particles have fairly high-density value. These differences can be mitigated with a higher level of bypass flow as gravitational losses decrease with decreasing residence/transport time.

As noted above, fluid-flows of the systems rate can be user-selected. Valve positions can be modulated and artifacts associated with the valve can help explain some edge morphology depicted in the performance data of FIGS. 7A and 7B.

Figure 8:
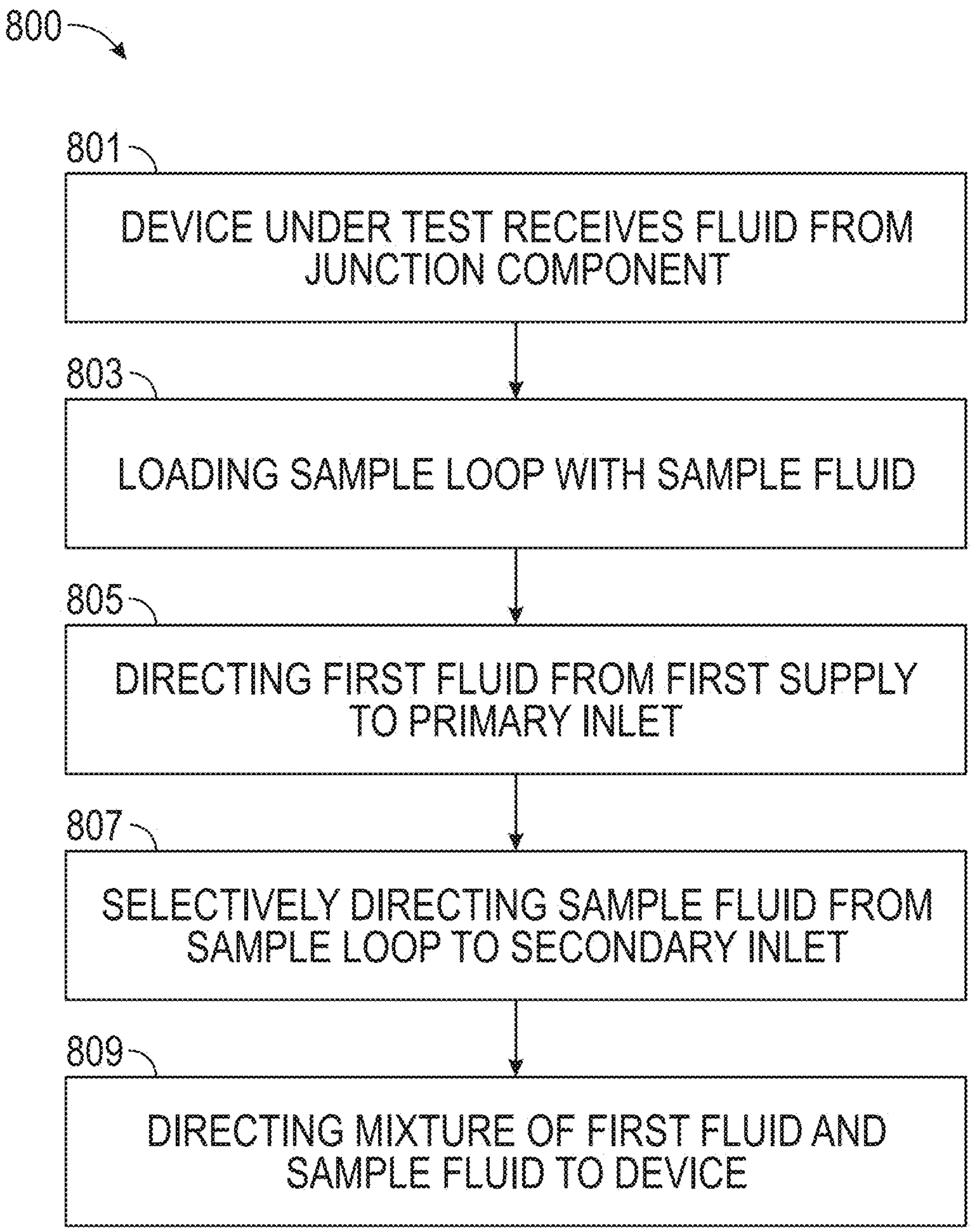
FIG. 8 shows an example of a flow chart, illustrating an exemplary method to test equipment using colloidal particles.

FIG. 8 shows an example of a flow chart 800, illustrating an exemplary method to test equipment using colloidal particles. The method of FIG. 8 allows an end-user (or an automated system as described below with reference to FIG. 9) to provide a test sample to one or more devices under test.

At operation 801, a device under test is arranged to receive a sample fluid from an outlet of a junction component. The sample fluid can include colloidal test particles (e.g., a particle-laden fluid). At operation 803, a sample loop is loaded with the sample fluid by, for example, controlling an injection valve. Controlling the injection valve can include selecting a mode of operation, such as a load mode or an inject mode. In the load mode, the sample loop receives the sample fluid. In the inject mode, the contents of the sample loop are dispersed in the junction component, mixed in the mixing coil, and delivered to the devices under test.

At operation 805, a first fluid (e.g., UPW) from a first supply is directed to a primary inlet (e.g., a first-inlet port) on the junction component. At operation 807, the sample fluid is selectively directed from the sample loop to the secondary inlet (e.g., the second-inlet port) on the junction component. The junction component then mixes the first fluid and the sample fluid prior to delivering the mixed fluids to the device under test. At operation 809, the mixed first fluid and the sample fluid are directed to the device under test.

Figure 9:
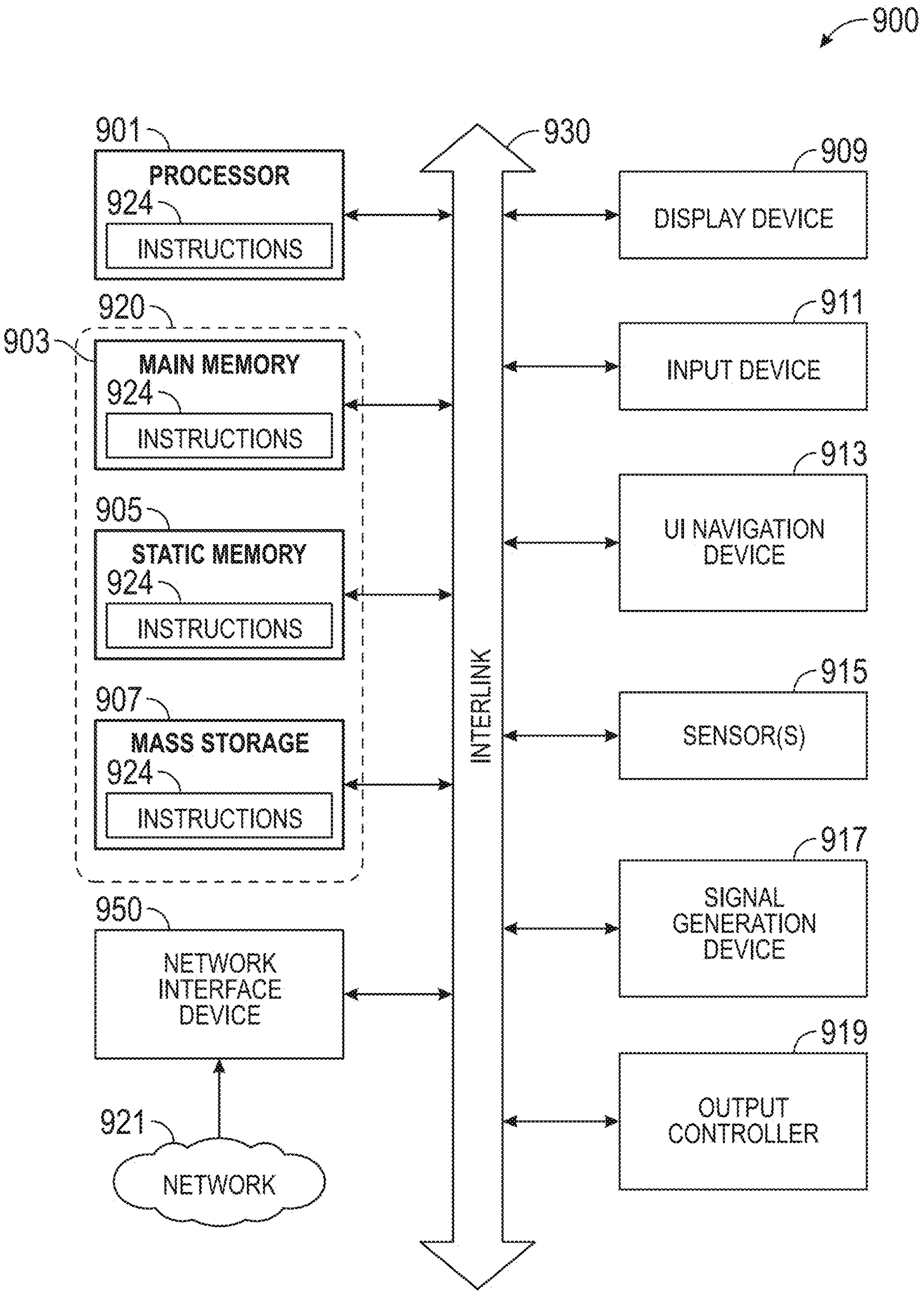
FIG. 9 shows a block diagram of an example comprising a machine upon which any one or more of the techniques (e.g., methods, analysis, or methodologies) discussed herein may be performed.

FIG. 9 shows an exemplary block diagram comprising a machine 900 upon which any one or more of the techniques (e.g., methods, analysis, or methodologies) discussed herein may be performed herein may be performed. In various examples, the machine 900 may operate as a standalone device or may be connected (e.g., networked) to other machines. In a networked deployment, the machine 900 may operate in the capacity of a server machine, a client machine, or both in server-client network environments. In various embodiments, the machine 900 may act in a supervisory control and data acquisition (SCADA) architecture. In an example, the machine 900 may act as a peer machine in peer-to-peer (P2P) (or other distributed) network environment. The machine 900 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 900 (e.g., computer system) may include a hardware processor 901 (e.g., a central processing unit (CPU), a graphics processing unit (GPU), a hardware processor core, or any combination thereof), a main memory 903 and a static memory 905, some or all of which may communicate with each other via an interlink 930 (e.g., a bus). The machine 900 may further include a display device 909, an input device 911 (e.g., an alphanumeric keyboard), and a user interface (UI) navigation device 913 (e.g., a mouse). In an example, the display device 909, the input device 911, and the UI navigation device 913 may comprise at least portions of a touch screen display. The machine 900 may additionally include a storage device 920 (e.g., a drive unit), a signal generation device 917 (e.g., a speaker), a network interface device 950, and one or more sensors 915, such as a global positioning system (GPS) sensor, compass, accelerometer, or other type of sensor. The machine 900 may include an output controller 919, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 920 may include a machine-readable medium on which is stored one or more sets of data structures or instructions 924 (e.g., software or firmware) embodying or utilized by any one or more of the techniques or functions described herein. The instructions 924 may also reside, completely or at least partially, within a main memory 903, within a static memory 905, within a mass storage device 907, or within the hardware-based processor 901 during execution thereof by the machine 900. In an example, one or any combination of the hardware-based processor 901, the main memory 903, the static memory 905, or the storage device 920 may constitute machine readable media.

While the machine-readable medium is considered as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 924 may further be transmitted or received over a communications network 921 using a transmission medium via the network interface device 950 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.25.4 family of standards, peer-to-peer (P2P) networks, among others. In an example, the network interface device 950 may include one or more physical jacks (e.g., Ethernet, coaxial, or phone jacks) or one or more antennas to connect to the communications network 921. In an example, the network interface device 950 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

In the context of the disclosed subject-matter contained herein, various embodiments of the disclosed subject-matter include, for example, a colloidal-particle injection system. In various embodiments, the injection system can include an injection pump, an injection valve, a junction component (e.g., a mixing tee), and a mixing component (e.g., a mixing device). Further, the description provided herein includes references to the accompanying drawings, which form a part of the detailed description. The drawings show, by way of illustration, specific embodiments in which the disclosed subject-matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. Moreover, in this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel," "perpendicular," "round," or "square," are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various configurations.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Further, functionally equivalent methods and devices within the scope of the disclosure, in addition to those enumerated herein, will be apparent to the skilled artisan from the foregoing descriptions. Portions and features of some embodiments, materials, and construction techniques may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment. As used herein, the terms "about," "approximately," and "substantially" may refer to values that are, for example, within +10% of a given value or range of values. Also, the term "exemplary" is used herein to indicate an example of an embodiment or concept, and not necessarily the best or sole means of achieving or practicing the embodiment or concept.

THE FOLLOWING NUMBERED EXAMPLES ARE SPECIFIC EMBODIMENTS OF THE DISCLOSED SUBJECT-MATTER

Example 1. In an embodiment, the disclosed subject-matter is a system to test particle instruments using colloidal particles or other particles. The system of this embodiment includes a sample-fluid source to provide test particles to at least one particle instrument under test. The sample-fluid source is selected from at least one source comprising a sample fluid-delivery device and a sample-fluid reservoir. A mixing component is coupled upstream of the at least one particle instrument under test. The embodiment also includes a junction component having a first-inlet port, a second-inlet port, and an outlet. The first-inlet port is to be coupled to a first-fluid supply, the second-inlet port is to receive test particles from the sample-fluid source. The junction component is further to mix a fluid received from the first-fluid supply and the test particles received from the sample-fluid source prior to transporting the mixed fluid through the outlet to the mixing coil.

Example 2. The system of Example 1, wherein the fluid from the first-fluid supply is a supply of ultra-pure water.

Example 3. The system of either Example 1 or Example 2, wherein the test particles comprise a diluted suspension of colloidal particles in a fluid.

Example 4. The system of any one of the preceding Examples, further including an injection valve.

Example 5. The system of any one of the preceding Examples, further including an injection pump coupled upstream from the junction component, the injection pump to control at least one parameter of parameters selected from a pressure of fluid delivered to the junction component and a flow rate of the fluid delivered to the junction component.

Example 6. The system of Example 5, wherein the injection pump can be modulated to be powered on or powered off to control a flow of the fluid.

Example 7. The system of any one of the preceding Examples, further including an injection valve, the injection valve comprising a sample loop to hold a supply of the test particles from the sample-fluid source, the injection valve being configured to select a mode of operation including a load mode, in which the test particles are to be loaded into the sample loop, and an inject mode, in which the test particles are to be transferred from the sample loop to the second-inlet port of the junction component.

Example 8. The system of any one of the preceding Examples, wherein the first-inlet port and the outlet are configured to receive an axial flow of fluid along a longitudinal axis of the junction component, the second-inlet port is disposed at a radial position relative to the longitudinal axis.

Example 9. The system of any one of the preceding Examples, wherein the sample-fluid source is a syringe pump.

Example 10. The system of any one of the preceding Examples, wherein the mixing component is configured to impart a circular flow to the mixed fluid.

Example 11. The system of any one of the preceding Examples, wherein an outlet is coupled downstream of the at least one particle instrument under test, the outlet is configured to be coupled to a drain to accommodate a predetermined excess volume of mixed fluid.

Example 12. In an embodiment, the disclosed subject-matter is a method for testing particle instruments using colloidal particles or other particles. The method of this embodiment includes receiving a sample fluid by at least one particle instrument under test from an outlet of a junction component; loading a sample loop with the sample fluid by controlling an injection valve; directing a first fluid from a first supply to a primary inlet of the junction component; directing the sample fluid from the sample loop to a secondary inlet on the junction component; and directing a mixture of the first fluid and the sample fluid to the at least one particle instrument under test.

Example 13. The method of Example 12, wherein the first fluid is ultra-pure water.

Example 14. The method of either Example 12 or Example 13, wherein the sample fluid includes test particles.

Example 15. The method of Example 14, wherein the test particles comprise a diluted suspension of colloidal particles in a fluid.

Example 16. The method of any one of Examples 12 through Example 15, further including imparting a circular flow in the mixture of the first fluid and the sample fluid prior to directing the mixture to the at least one particle instrument under test.

Example 17. In an embodiment, the disclosed subject-matter is a computer-readable medium containing instructions that, when executed by a machine, cause the machine to perform operations for testing particle instruments using colloidal particles or other particles. The operations of this embodiment include receiving a sample fluid by at least one particle instrument under test from an outlet of a junction component; loading a sample loop with the sample fluid by controlling an injection valve; directing a first fluid from a first supply to a primary inlet of the junction component; directing the sample fluid from the sample loop to a secondary inlet on the junction component; and directing a mixture of the first fluid and the sample fluid to the at least one particle instrument under test.

Example 18. The computer-readable medium of Example 17, wherein the sample fluid includes test particles.

Example 19. The computer-readable medium of Example 18, wherein the test particles comprise a diluted suspension of colloidal particles in a fluid.

Example 20. The computer-readable medium of any one of Example 17 through Example 19, further including imparting a circular flow in the mixture of the first fluid and the sample fluid prior to directing the mixture to the at least one particle instrument under test.

What is claimed is:

1. A test-particle injection system, the system comprising:

a sample-fluid source to provide test particles to at least one particle instrument under test, the sample-fluid source selected from at least one source comprising a sample fluid-delivery device and a sample-fluid reservoir;

a mixing component to be coupled upstream of the at least one particle instrument under test; and a junction component having a first-inlet port, a second-inlet port, and an outlet, the first-inlet port is to be coupled to a first-fluid supply, the second-inlet port is to receive test particles from the sample-fluid source, the junction component is further to mix a fluid received from the first-fluid supply and the test particles received from the sample-fluid source prior to transporting the mixed fluid through the outlet to the mixing component.

2. The test-particle injection system of claim 1, wherein the fluid from the first-fluid supply is a supply of ultra-pure water.

3. The test-particle injection system of claim 1, wherein the test particles comprise a diluted suspension of colloidal particles in a fluid.

4. The test-particle injection system of claim 1, further comprising an injection valve.

5. The test-particle injection system of claim 1, further comprising an injection pump coupled upstream from the junction component, the injection pump to control at least one parameter of parameters selected from a pressure of fluid delivered to the junction component and a flow rate of the fluid delivered to the junction component.

6. The test-particle injection system of claim 5, wherein the injection pump can be modulated to be powered on or powered off to control a flow of the fluid.

7. The test-particle injection system of claim 1, further comprising an injection valve, the injection valve comprising a sample loop to hold a supply of the test particles from the sample-fluid source, the injection valve being configured to select a mode of operation including a load mode, in which the test particles are to be loaded into the sample loop, and an inject mode, in which the test particles are to be transferred from the sample loop to the second-inlet port of the junction component.

8. The test-particle injection system of claim 1, wherein the first-inlet port and the outlet are configured to receive an axial flow of fluid along a longitudinal axis of the junction component, the second-inlet port is disposed at a radial position relative to the longitudinal axis.

9. The test-particle injection system of claim 1, wherein the sample-fluid source is a syringe pump.

10. The test-particle injection system of claim 1, wherein the mixing component is configured to impart a circular flow to the mixed fluid.

11. The test-particle injection system of claim 1, wherein an outlet is coupled downstream of the at least one particle instrument under test, the outlet is configured to be coupled to a drain to accommodate a predetermined excess volume of mixed fluid.

12. A method for testing particle instruments, the method comprising:

receiving a sample fluid by at least one particle instrument under test from an outlet of a junction component;

loading a sample loop with the sample fluid by controlling an injection valve;

directing a first fluid from a first supply to a primary inlet of the junction component;

directing the sample fluid from the sample loop to a secondary inlet on the junction component;

directing a mixture of the first fluid and the sample fluid to the at least one particle instrument under test; and imparting a circular flow in the mixture of the first fluid and the sample fluid prior to directing the mixture to the at least one particle instrument under test.

13. The method of claim 12, wherein the first fluid is ultra-pure water.

14. The method of claim 12, wherein the sample fluid includes test particles.

15. The method of claim 14, wherein the test particles comprise a diluted suspension of colloidal particles in a fluid.

16. The method of claim 12, wherein imparting the circular flow comprises inducing a secondary flow in the mixture as the mixture traverses a curved flow path, the secondary flow comprising fluid near a center of the flow path moving toward an outside of the flow path and fluid near a wall of the flow path moving inwards.

17. A computer-readable medium containing instructions that, when executed by a machine, cause the machine to perform operations for testing particle instruments, the operations comprising:

receiving a sample fluid by at least one particle instrument under test from an outlet of a junction component;

loading a sample loop with the sample fluid by controlling an injection valve;

directing a first fluid from a first supply to a primary inlet of the junction component;

directing the sample fluid from the sample loop to a secondary inlet on the junction component;

directing a mixture of the first fluid and the sample fluid to the at least one particle instrument under test;

imparting a circular flow in the mixture of the first fluid and the sample fluid prior to directing the mixture to the at least one particle instrument under test.

18. The computer-readable medium of claim 17, wherein the sample fluid includes test particles.

19. The computer-readable medium of claim 18, wherein the test particles comprise a diluted suspension of colloidal particles in a fluid.

20. The computer-readable medium of claim 17, wherein imparting the circular flow comprises inducing a secondary flow in the mixture as the mixture traverses a curved flow path, the secondary flow comprising fluid near a center of the flow path moving toward an outside of the flow path and fluid near a wall of the flow path moving inwards.

* * * * *